United States Patent Office 3,121,657
Patented Feb. 18, 1964

3,121,657
TEA BAG PAPER
Donald G. Magill, Jr., Milford, N.J., assignor to Riegel Paper Corporation, New York, N.Y., a corporation of Delaware
No Drawing. Filed Aug. 23, 1956, Ser. No. 605,721
5 Claims. (Cl. 161—159)

This invention relates to paper used for tea bags and, more particularly, to a highly porous polyethylene-coated tea bag paper. The invention further provides a process for making the highly porous polyethylene-coated tea bag paper, involving restoring the porosity and increasing the wet strength of a thin sheet of porous paper coated with an impermeable polyethylene film.

The fabrication of tea bags has required the development of special long fibered papers possessing a high degree of porosity and sufficient wet-strength to withstand immersion into boiling water. Because the aroma of tea is easily marred by extraneous odors, the heat sealing and bonding agents incorporated into these special papers must necessarily be non-toxic and incapable of imparting any odor or flavor to the paper, or to the beverage brewed from tea contained in a bag made thereof.

During the development of various protective coating and bonding agents which may be suitably applied to a highly porous paper, such as tea bag paper, some attention has been directed towards the feasibility of coating tea bag paper with polyethylene film, since this film possesses excellent tear strength, yet has absolutely no odor or taste. Due to the impermeable nature of polyethylene, however, coating tea bag paper with a film of polyethylene results in a substantially completely impermeable paper.

Using tea bag paper coated with an impermeable film of polyethylene, we have found that the polyethylene film, adhering to the sheet of paper, fractures into a multitude of minute fissures upon heating the coated paper. Furthermore, we have found that this treatment of the coated paper not only restores the porosity, but results in a substantially increased wet-strength. Accordingly, the method of this invention for restoring the porosity and increasing the wet-strength of a sheet of tea bag paper coated with an extremely thin, but continuous, impermeable film of polyethylene, extruded onto the paper in a molten state, comprises heating the coated paper to a temperature sufficiently high to shrink the polyethylene film adhering to the sheet so that the film fractures into a multitude of minute fissures. This heat-induced shrinkage of the polyethylene film not only restores the porosity of the paper by virtue of the minute fissures in the film, but also results in an increased wet-strength.

The method of our invention is accomplished most advantageously by using a thin sheet of paper formed from long fibers, such as bleached hemp, sisal, abaca, and West Coast soft wood. A low density tissue paper having many interstices has been found to serve as an excellent base paper, since it permits rapid filtration, i.e. possesses high infusion characteristics. Inasmuch as a polyethylene coating will be used to strongly bond the paper, no or substantially no chemical bonding agents need be incorporated into the sheet.

An extrusion coating process is used to apply a molten polyethylene film to one side of the sheet of tea bag paper. In actual practice, polyethylene chips are fed into a storage hopper of a standard coating machine and transported by screw through a heat extrusion chamber, in which the polyethylene is transformed into a molten liquid. Molten polyethylene is subject to severe oxidative degradation if maintained at high temperatures over extended periods of time, and consequently it is advisable to use polyethylene containing a small quantity of an anti-oxidative, such as diphenyl-p-phenylenediamine, to stabilize it during the high temperature extrusion.

A thin film of the molten polyethylene is extruded onto one side of the sheet, which is then passed through a pair of rollers to chill the film and press it against the sheet. Although the polyethylene may be easily extruded at temperatures immediately above the melting point of the particular polyethylene employed, we have observed that particularly thin coatings are obtained by extruding the molten polyethylene at temperatures sufficiently high to completely transform the polyethylene from a crystalline to an amorphous state. At extrusion temperatures of from 500° to 650° F. a molten film of polyethylene having a molecular weight of 19,000 may be uniformly coated on tea bag paper so that only 2 pounds of resin are required to completely coat a ream of paper. Although the thickness of this polyethylene film is only about 0.1 mil, the tea bag paper is made impermeable.

Generally, we have found that polyethylenes possessing a molecular weight in the range of 15,000 to 22,000 may be satisfactorily coated on tea bag paper to give extremely thin but substantially continuous impermeable films. Polyethylenes in this molecular weight range are characterized by relatively low tensile strengths and a high percent elongation. A polyethylene resin having a molecular weight substantially in excess of 22,000 may also be extruded on paper, but usually requires a higher extrusion temperature to obtain sufficiently thin films.

Inasmuch as molten polyethylene is characterized by an amorphous molecular configuration, the extrusion of polyethylene at these high temperatures gives rise to substantial internal stresses in the extruded film. Upon rapidly chilling the thin polyethylene film adhering to the tea bag paper, the crystalline nature of the polyethylene film is partially but not completely restored. Although several extruder variables, such as the rate of extrusion, hot stretch distance, and the size of the die orifice, influence the properties of the polyethylene-coated sheet, the thermal history of the polyethylene film determines, to a large extent, the subsequent heating temperature which is necessary to shrink the film and cause it to develop a series of minute fissures.

As indicated previously, the extrusion coating process results in a tea bag paper uniformly coated with an extremely thin but substantially continuous impermeable polyethylene film. To restore the porosity and simultaneously increase the wet-strength of the coated paper, it is heated to a temperature sufficiently high to shrink the polyethylene film adhering to the sheet, causing the film to fracture into a multitude of minute fissures, the temperature being dependent, of course, on both the thickness and the thermal history of the particular polyethylene film adhering to the tea bag paper.

In one embodiment of our invention, the coated paper is heated, substantially immediately after the extrusion coating of the sheet to form the highly porous polyethylene-coated tea bag paper. Alternatively, the heat-induced shrinkage of the polyethylene film may be accomplished, if an appropriate polyethylene is employed, by immersing the coated paper, having the thin impermeable polyethylene film, in hot water to shrink the film and cause it to develop minute fissures. This latter method, in particular, offers a unique advantage in that tea contained in an envelope of paper coated with an impermeable polyethylene film may be stored without deterioration, the envelope needing then only to be immersed in hot water to restore the porosity to the coated paper.

To illustrate the process of our invention for preparing a highly porous polyethylene-coated tea bag paper, a sheet of very porous tissue, weighing about 9 pounds per ream, was coated with an extremely thin polyethylene film, which was extruded on the paper at a temperature of about 550° to 600° F. Approximately 2 pounds of polyethylene were used for each ream (500 24" x 36" sheets) of paper, so that the coated paper contained a polyethylene film having a thickness of only about 0.1 mil. Subsequent heating of the coated sheet to a temperature of about 300° F. for approximately 30 seconds was sufficient to shrink the polyethylene film, adhering to the sheet, and cause the film to develop a multipde of minute fissures. The heat-induced shrinkage resulted in a highly porous sheet having a wet strength of approximately twice the value of the uncoated sheet. The following table illustrates the differences in physical properties of the tea bag paper prepared in the above manner, when compared to uncoated paper and paper coated with an impermeable film of polyethylene:

Table I

|  | Polyethylene Coated Tissue From Which Polyethylene Film has been Stripped | Polyethylene Coated Tissue | Polyethylene Coated Tissue that has been Heated |
|---|---|---|---|
| Basis Wt | 9.34 | 11.02 | 10.83 |
| Gauge, mils | 3.5 | 3.4 | 4.1 |
| App. Density | 2.68 | 3.27 | 2.64 |
| Tear, Machine Direction/Cross Direction | 28/34 | 42/50 | 48/52 |
| Dry Tensile, MD/CD | 2.3/1.7 | 3.1/1.9 | 3.1/2.3 |
| Wet Tensile, MD/CD | .5/.4 | .7/.6 | 1.1/1.0 |
| Percent Wet Strength, MD/CD | 21.8/23.5 | 22.6/31.6 | 35.6/43.5 |
| p.p. Porosity | .4 | No Reading | 4.4 |
| Permeometer, c.f.m | 364 | 0.0 | 21 |
| Water Climb, MD/CD: |  |  |  |
| 1–5 min | 11/8 |  | 5/3 |
| 1–5 min | 16/13 |  | 10/8 |

A greater increase in the porosity of this sheet may be realized by elevating the temperature at which the polyethylene film is shrunk. Using different samples of tea bag paper, coated with an extremely thin but substantially continuous impermeable polyethylene film, the porosity was restored by heating to temperatures between 300° and 340° F., resulting in an increased porosity at the higher temperatures:

Table II

|  | 300° | 325° | 340° |
|---|---|---|---|
| p.p. Porosity | 5.2 | 1.9 | 1.7 |
| Permeometer, c.f.m | 24 | 50 | 65 |

A precise theoretical explanation of the heat-induced shrinkage of the polyethylene film is not readily available. It may be postulated, however, that the subsequent heating of the thin polyethylene film allows the polyethylene molecules to seek a more orderly and crystalline configuration, which in turn induces the appreciable shrinkage in the film.

As the polyethylene film shrinks, a multitude of minute fissures develop in the film, thus restoring the porosity to the coated paper. These minute fissures are barely visible to the naked eye without the aid of magnification. Notwithstanding the fact that the polyethylene film contains the minute fissures, the wet-strength of the resultant highly porous polyethylene-coated tea bag paper is increased to a value approximately twice that of the uncoated paper.

I claim:

1. A highly porous, infusible, polyethylene-coated tea bag paper comprising a thin, infusible tea bag tissue having normally high infusion characteristics and a basis weight in the order of nine pounds per ream of 3,000 square feet, and an extremely thin polyethylene film intimately bonded to said tissue as a uniform coating, and having a multitude of minute fissures therein, whereby the infusibility of the coated tissue is substantially as great as that of the tissue alone.

2. The tea bag paper of claim 1, in which said polyethylene film has a thickness on the order of 0.1 mil.

3. A polyethylene-coated tea bag paper, comprising a thin sheet of porous tea bag tissue having high normal infusion characteristics and a basis weight on the order of nine pounds per ream of 3,000 square feet, and a substantially uniform, continuous and impervious film of polyethylene bonded to said tissue, said film having a thickness on the order of 0.1 mil and being of a character such as to form a multitude of minute fissures upon immersion in hot water, whereby the normally high infusion characteristics of the tissue are substantially restored.

4. The tea bag paper of claim 3, in which said polyethylene film comprises the principal wet strength bonding agent.

5. The method of treating infusible tea bag tissue having normally high infusion characteristics and a basis weight in the order of nine pounds per ream of 3,000 square feet to improve the wet strength of the tissue without significantly impairing the infusion characteristics of the tissue, which comprises forming on the infusible tissue, an extremely thin but substantially continuous and impermeable polyethylene film, and subsequently restoring the infusion characteristics of the tissue substantially to normal by immersing said film in hot water and thereby heating the film to a temperature sufficiently high to shrink the polyethylene film and develop therein a multitude of minute fissures.

References Cited in the file of this patent

UNITED STATES PATENTS

| 2,155,441 | Osborne | Apr. 25, 1939 |
| 2,536,048 | Flanagan | Jan. 2, 1951 |
| 2,554,662 | Cowgill | May 29, 1951 |
| 2,679,887 | Doyle et al. | June 1, 1954 |
| 2,697,664 | Goeser et al. | Dec. 21, 1954 |
| 2,714,571 | Irion et al. | Aug. 2, 1955 |
| 2,716,074 | Mick et al. | Aug. 23, 1955 |
| 2,728,672 | Young | Dec. 27, 1955 |
| 2,897,109 | Voigtman | July 28, 1959 |
| 2,926,088 | Spiselman | Feb. 23, 1960 |

FOREIGN PATENTS

| 728,203 | Great Britain | Apr. 23, 1955 |